(No Model.)
A. L. CLARK.
IMPLEMENT FOR REMOVING CURBS OR TUBES FROM THE GROUND.
No. 559,932. Patented May 12, 1896.
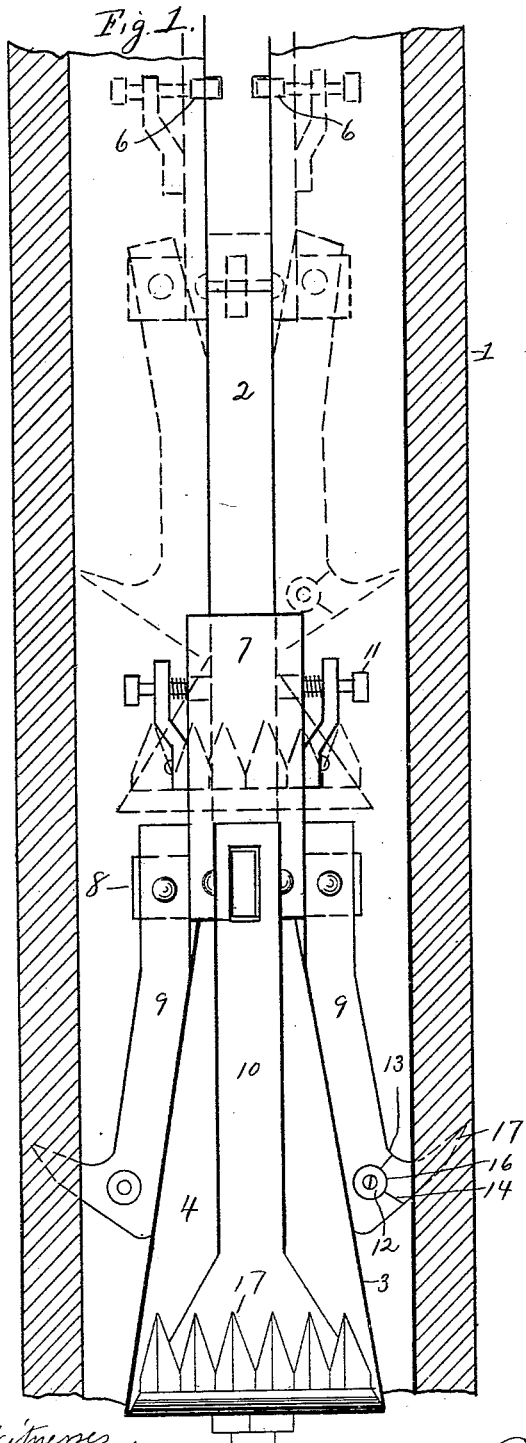
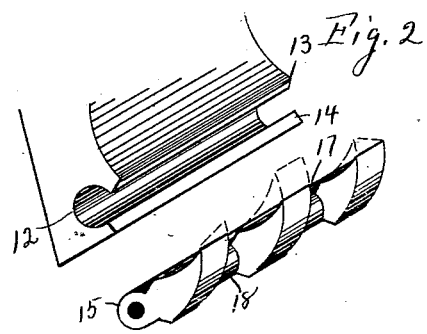
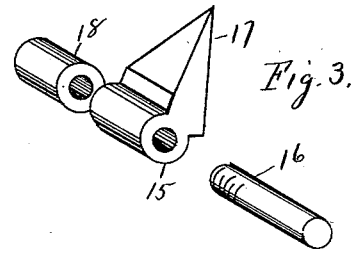
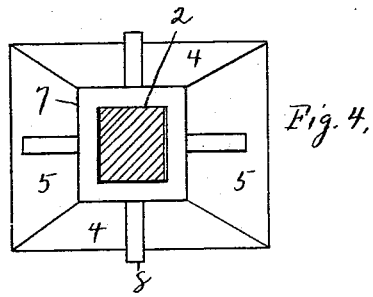
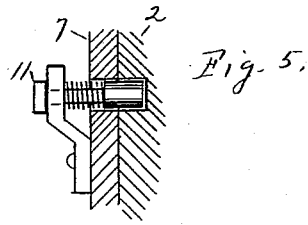

UNITED STATES PATENT OFFICE.

ALLEN LONG CLARK, OF JACKSON, TENNESSEE.

IMPLEMENT FOR REMOVING CURBS OR TUBES FROM THE GROUND.

SPECIFICATION forming part of Letters Patent No. 559,932, dated May 12, 1896.

Application filed February 21, 1895. Serial No. 539,299. (No model.)

*To all whom it may concern:*

Be it known that I, ALLEN LONG CLARK, a citizen of the United States, residing at Jackson, in the county of Madison and State of Tennessee, have invented a certain new, useful, and valuable Improvement in Implements for Removing Curbs or Tubes from the Ground, of which the following is a full, clear, and exact description.

My invention has relation to implements for removing curbs or tubes from Artesian wells, &c.; and it consists in the novel construction and arrangement of its parts, as hereinafter described.

In the accompanying drawings, Figure 1, the heavy lines represent the implement secured in the tube. Figs. 2, 3, 4, and 5 are detail views of different parts which will be explained hereinafter.

The curb or tube 1 may be constructed of wood or metal, and it is located in the ground. The implement consists of a rod 2, having attached to its lower end the pyramidal-shape piece 3. The sides 4 4 of the said pyramid are wider than the sides 5 5, (see Fig. 4,) the object of which will be hereinafter explained. The rod 2 is also provided with the indentations 6 6. A loose collar 7 is located on the rod 2. Said collar is provided with the four lugs 8 8, to which are pivoted the shanks 9 9 and 10 10. The said collar is also provided with the spring-actuated bolts 11 11, which are adapted to enter the indentations 6 6. The shanks 10 10 are longer than the shanks 9 9, and said shanks 9 9 rest against the narrow sides 5 5 of the pyramid 3, and the shanks 10 10 rest against the wide sides 4 4 of the said pyramid.

The shanks may be provided with the removable teeth, as shown in Figs. 2 and 3. The shank is provided with the recess 12, having the abutting flanges 13 and 14. The tooth-points have a part 15, adapted to slip longitudinally in the recess 12. Said part 15 is perforated longitudinally. Said perforation is adapted to hold a bolt 16, which firmly retains said point in the tooth. The teeth 17 17 are integral with the part 15, and the extreme ends of said points may form a straight line or an arc of a circle. (See dotted lines, Fig. 2.) The straight-line teeth are used when removing a rectangular curb and the circular teeth are used when removing a cylindrical curb. The teeth 17 rest firmly between the flanges 13 and 14 (see Fig. 1) and are securely braced thereby.

Fig. 2 shows the teeth 17 and the sections 18 made in one piece or integral.

Fig. 3 shows the section 18 independent of the tooth 17.

The advantage of the latter arrangement is that should the tooth-point be broken in drawing a tube it can be replaced by another tooth without rendering useless the other teeth-points in the bar, as would be the case should one of the teeth, as shown in Fig. 2, be broken.

The implement is operated as follows: The tube to be removed is in the ground. The implement, with the shanks 9 9 and 10 10 resting at the lowest possible point, is lowered into the tube or curb. When the implement is lowered to the proper distance, the rod 2 is pulled up, the consequence of which is that the points of the said teeth are forced into the sides of the tube by the pyramid 3. The teeth 10 10 will grasp the tube in a lower plane than the teeth 9 9, and therefore the tube is not weakened and is rendered less liable to break, and at the same time the tube is grasped on all sides. Thus the implement is secured to the tube, and by raising the implement the tube is raised also. In order to disengage the teeth from the sides of the tube, the rod 2 is lowered and the spring-actuated bolts 11 11 will enter the indentations 6 6, and by lowering the rod 2 still farther the teeth will disengage the tube, and the shanks and collar 7 will assume the position as shown by the dotted lines in Fig. 1, and then the implement can be removed.

Having described my invention, what I claim as new, and desire to secure by Letters Patent, is—

An implement for removing hollow tubes, &c. from the ground, consisting of a single rod, the single wedge-shape piece having a central perforation passing perpendicularly therethrough the lower end of the rod passing through said perforation and secured therein, a loose collar surrounding said rod, said collar having suitable lugs extending from the outer sides thereof, teeth having suitable shanks, said shanks pivoted to the lugs of the loose collar, said shanks being not of a uniform length each shank adapted to rest on one of the inclined sides of the wedge and the teeth adapted to engage the sides of the tube, as set forth.

In testimony whereof I affix my signature in presence of two witnesses.

ALLEN LONG CLARK.

Witnesses:
W. BERANS,
H. HOWE.